(12) United States Patent
Yamoto

(10) Patent No.: US 11,735,044 B2
(45) Date of Patent: Aug. 22, 2023

(54) INFORMATION TRANSMISSION SYSTEM

(71) Applicant: Honda Motor Co., Ltd., Tokyo (JP)

(72) Inventor: Kazuki Yamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/676,195

(22) Filed: Feb. 20, 2022

(65) Prior Publication Data

US 2022/0284812 A1 Sep. 8, 2022

(30) Foreign Application Priority Data

Mar. 3, 2021 (JP) .................. 2021-033435

(51) Int. Cl.
G08G 1/0967 (2006.01)
H04W 4/46 (2018.01)
G06V 20/58 (2022.01)

(52) U.S. Cl.
CPC ..... G08G 1/096791 (2013.01); G06V 20/584 (2022.01)

(58) Field of Classification Search
CPC .................. G08G 1/096791; G06V 20/584
See application file for complete search history.

(56) References Cited

U.S. PATENT DOCUMENTS

| | | | | |
|---|---|---|---|---|
| 2008/0187318 A1* | 8/2008 | Osanai | ................ | H04B 10/116 398/129 |
| 2015/0349885 A1* | 12/2015 | Endo | ................ | H04B 10/1123 398/130 |
| 2020/0193821 A1* | 6/2020 | Kawaharada | .... | G08G 1/096844 |
| 2020/0312140 A1* | 10/2020 | Kurehashi | ........ | G08G 1/096716 |
| 2021/0179135 A1* | 6/2021 | Ahn | ................... | G01C 21/3415 |
| 2021/0248906 A1* | 8/2021 | Wang | ..................... | G08G 1/166 |
| 2022/0073106 A1* | 3/2022 | Ahn | ....................... | H04W 4/40 |
| 2022/0081011 A1* | 3/2022 | Kleinau | ........... | B60W 60/0015 |
| 2022/0208008 A1* | 6/2022 | Matsuoka | ............... | G08G 1/07 |
| 2022/0284814 A1* | 9/2022 | Nakazono | ............. | G08G 1/163 |

FOREIGN PATENT DOCUMENTS

| | | | |
|---|---|---|---|
| JP | H05128399 A | | 5/1993 |
| JP | 2012089075 A | * | 5/2012 |
| KR | 20210043066 A | * | 4/2021 |
| KR | 20220030231 A | * | 3/2022 |

* cited by examiner

*Primary Examiner* — Chico A Foxx
(74) *Attorney, Agent, or Firm* — Duft & Bornsen, PC

(57) ABSTRACT

An information transmission system including a first vehicle and a second vehicle, the first vehicle being subjected to a traffic control by a traffic light, the second vehicle being subjected to the traffic control by the traffic light after the first vehicle, each of the first vehicle and the second vehicle including a communication unit capable of communicating with each other, and an electronic control unit including a microprocessor and a memory connected to the microprocessor. Each of the microprocessor of the first vehicle and the microprocessor of the second vehicle is configured to perform acquiring a change information of the traffic light, and updating the change information acquired, and the microprocessor of the second vehicle is configured to perform the acquiring including acquiring the change information updated by the microprocessor of the first vehicle through the communication unit.

7 Claims, 6 Drawing Sheets

INFORMATION TRANSMISSION SYSTEM

CROSS-REFERENCE TO RELATED APPLICATION

This application is based upon and claims the benefit of priority from Japanese Patent Application No. 2021-033435 filed on Mar. 3, 2021, the content of which is incorporated herein by reference.

BACKGROUND OF THE INVENTION

Field of the Invention

This invention relates to an information transmission system transmitting an information on a traffic light.

Description of the Related Art

Conventionally, as this type of apparatus, there has been known an apparatus that receives signals transmitted from roadside beacons and including information on the positions of traffic lights installed in the traveling direction of a vehicle and parameters for color changes of the traffic lights, and calculates a speed range in which the vehicle can pass through the traffic lights in a blue lighting time zones of the traffic lights on the basis of these received signals. Such an apparatus is disclosed, for example, in Japanese Unexamined Patent Publication No. 5-128399 (JPHS-128399A).

However, the apparatus described in JPHS-128399A requires installation of roadside beacons which will leads to cost increase, and it is thus difficult to apply the apparatus to information transmission of various traffic lights.

SUMMARY OF THE INVENTION

An aspect of the present invention is an information transmission system including a first vehicle and a second vehicle, the first vehicle being subjected to a traffic control by a traffic light, the second vehicle being subjected to the traffic control by the traffic light after the first vehicle, each of the first vehicle and the second vehicle including a communication unit capable of communicating with each other, and an electronic control unit including a microprocessor and a memory connected to the microprocessor. Each of the microprocessor of the first vehicle and the microprocessor of the second vehicle is configured to perform acquiring a change information of the traffic light, and updating the change information acquired. The microprocessor of the second vehicle is configured to perform the acquiring including acquiring the change information updated by the microprocessor of the first vehicle through the communication unit.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 4. An information transmission system according to an embodiment of the invention is configured to transmit a change information of a traffic light between vehicles through an inter-vehicle communication. The vehicle include a subject vehicle ant another vehicle, and each of these vehicles is configured as a vehicle having a self-driving capability, i.e., a self-driving vehicle. One or both of the subject vehicle and the other vehicle may be a manual driving vehicle.

Figure 1:
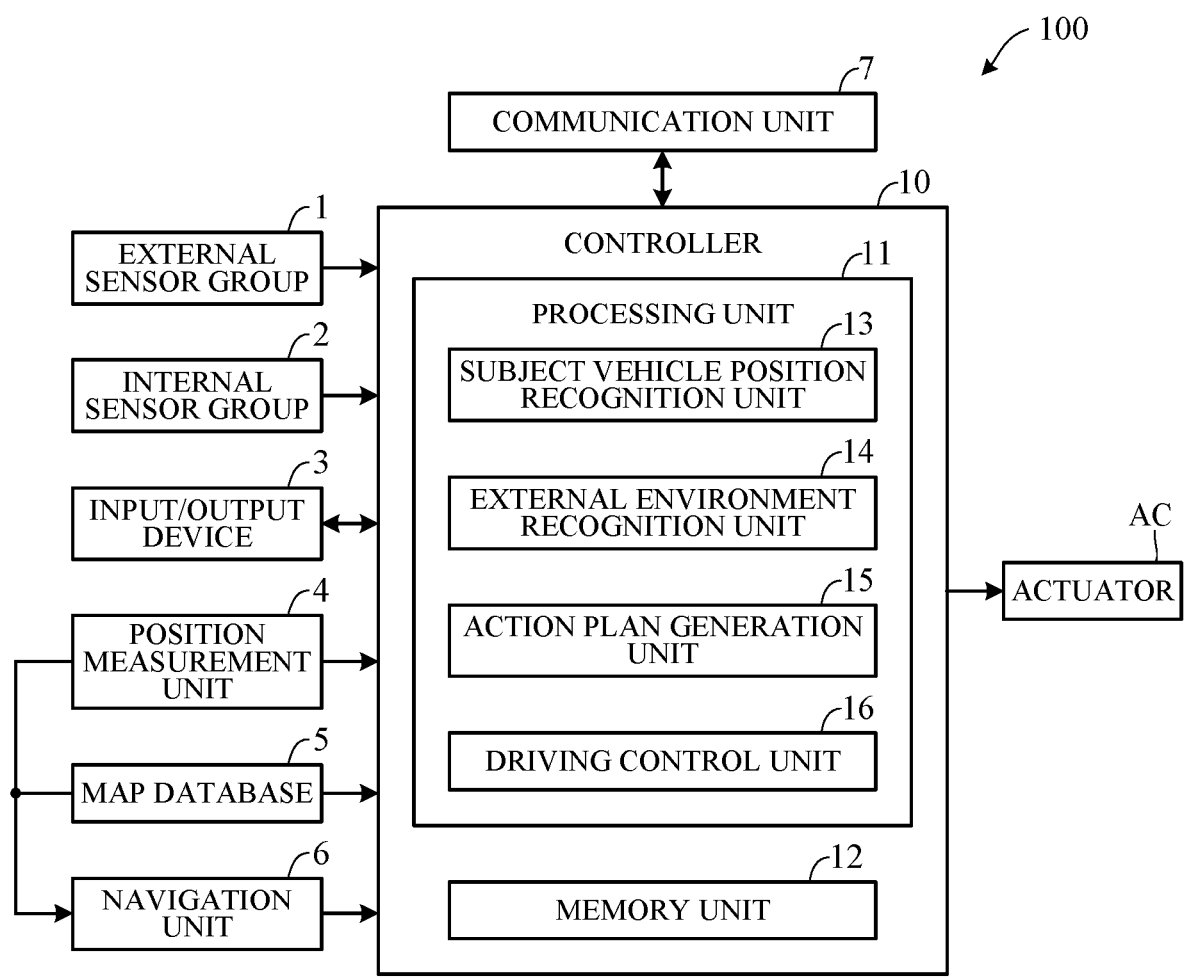
FIG. 1 is a block diagram schematically illustrating an overall configuration of a vehicle control system in a self-driving vehicle to which an information transmission system according to an embodiment of the present invention is applied.

First, the general configuration of the subject vehicle for self-driving will be explained. FIG. 1 is a block diagram schematically illustrating an overall configuration of a vehicle control system 100 of the self-driving vehicle to which the information transmission system according to an embodiment of the present invention is applied. As shown in FIG. 1, the vehicle control system 100 mainly includes a controller 10, and an external sensor group 1, an internal sensor group 2, an input/output device 3, a position measurement unit 4, a map database 5, a navigation unit 6, a communication unit 7 and actuators AC which are communicably connected with the controller 10. The self-driving vehicle can travel not only in a self-drive mode in which a driving operation by a driver is unnecessary, but also in a manual drive mode in which the driving operation by the driver is necessary.

The term external sensor group 1 herein is a collective designation encompassing multiple sensors (external sensors) for detecting external circumstances constituting subject vehicle ambience data. For example, the external sensor group 1 includes, inter alia, a LIDAR (Light Detection and Ranging) for measuring distance from the subject vehicle to ambient obstacles by measuring scattered light produced by laser light radiated from the subject vehicle in every direction, a RADAR (Radio Detection and Ranging) for detecting other vehicles and obstacles around the subject vehicle by radiating electromagnetic waves and detecting reflected waves, and a CCD, CMOS or other image sensor-equipped on-board cameras for imaging subject vehicle ambience (forward, reward and sideways).

The term internal sensor group 2 herein is a collective designation encompassing multiple sensors (internal sensors) for detecting driving state of the subject vehicle. For example, the internal sensor group 2 includes, inter alia, a vehicle speed sensor for detecting vehicle speed of the subject vehicle, acceleration sensors for detecting forward-rearward direction acceleration and lateral acceleration of the subject vehicle, respectively, rotational speed sensor for detecting rotational speed of the travel drive source, a yaw rate sensor for detecting rotation angle speed around a vertical axis passing center of gravity of the subject vehicle and the like. The internal sensor group 2 also includes sensors for detecting driver driving operations in manual drive mode, including, for example, accelerator pedal operations, brake pedal operations, steering wheel operations and the like.

The term input/output device 3 is used herein as a collective designation encompassing apparatuses receiving instructions input by the driver and outputting information to the driver. The input/output device 3 includes, inter alia, switches which the driver uses to input various instructions, a microphone which the driver uses to input voice instructions, a display for presenting information to the driver via displayed images, and a speaker for presenting information to the driver by voice.

The position measurement unit (GNSS unit) 4 includes a position measurement sensor for receiving signal from positioning satellites to measure the location of the subject vehicle. The positioning satellites are satellites such as GPS satellites and Quasi-Zenith satellite. The position measurement unit 4 measures absolute position (latitude, longitude and the like) of the subject vehicle based on signal received by the position measurement sensor.

The map database 5 is a unit storing general map data used by the navigation unit 6 and is, for example, implemented using a magnetic disk or semiconductor element. The map data include road position data and road shape (curvature etc.) data, along with intersection and road branch position data. The map data stored in the map database 5 are different from high-accuracy map data stored in a memory unit 12 of the controller 10.

The navigation unit 6 retrieves target road routes to destinations input by the driver and performs guidance along selected target routes. Destination input and target route guidance is performed through the input/output device 3. Target routes are computed based on current position of the subject vehicle measured by the position measurement unit 4 and map data stored in the map database 35. The current position of the subject vehicle can be measured, using the values detected by the external sensor group 1, and on the basis of this current position and high-accuracy map data stored in the memory unit 12, target route may be calculated.

The communication unit 7 communicates through networks including the Internet and other wireless communication networks to access servers (not shown in the drawings) to acquire map data, travel history information of other vehicle, traffic data and the like, periodically or at arbitrary times. In addition to acquiring travel history information of the other vehicle, travel history information of the subject vehicle may be transmitted to the server via the communication unit 7. The networks include not only public wireless communications network, but also closed communications networks, such as wireless LAN, Wi-Fi and Bluetooth, which are established for a predetermined administrative area. Communication with the other vehicle via the communication unit 7, i.e. inter-vehicle communication is also possible, thereby it is possible to obtain information which the other vehicle has and provide information to the other vehicle.

The actuators AC are actuators for traveling of the subject vehicle. If the travel drive source is the engine, the actuators AC include a throttle actuator for adjusting opening angle of the throttle valve of the engine (throttle opening angle). If the travel drive source is the travel motor, the actuators AC include the travel motor. The actuators AC also include a brake actuator for operating a braking device and turning actuator for turning the front wheels FW.

The controller 10 is constituted by an electronic control unit (ECU). More specifically, the controller 10 incorporates a computer including a CPU or other processing unit (a microprocessor) 51 for executing a processing in relation to travel control, the memory unit (a memory) 12 of RAM, ROM and the like, and an input/output interface or other peripheral circuits not shown in the drawings. In FIG. 1, the controller 10 is integrally configured by consolidating multiple function-differentiated ECUs such as an engine control ECU, a transmission control ECU and so on. Optionally, these ECUs can be individually provided.

The memory unit 12 stores high-accuracy detailed road map data (road map information). The road map information includes information on road position, information on road shape (curvature, etc.), information on gradient of the road, information on position of intersections and branches, information on the number of lanes, information on width of lane and the position of each lane (center position of lane and boundary line of lane), information on position of landmarks (traffic lights, signs, buildings, etc.) as a mark on the map, and information on the road surface profile such as unevennesses of the road surface, etc. The map information stored in the memory unit 12 includes map information acquired from the outside of the subject vehicle through the communication unit 7, and map information created by the subject vehicle itself using the detection values of the external sensor group 1 or the detection values of the external sensor group 1 and the internal sensor group 2.

As functional configurations in relation to mainly self-driving, the processing unit 11 includes a subject vehicle position recognition unit 13, an external environment recognition unit 14, an action plan generation unit 15, and a driving control unit 16.

The subject vehicle position recognition unit 13 recognizes the position of the subject vehicle (subject vehicle position) on the map based on position information of the subject vehicle calculated by the position measurement unit 4 and map information stored in the map database 5. Optionally, the subject vehicle position can be recognized using map information stored in the memory unit 12 and ambience data of the subject vehicle detected by the external sensor group 1, whereby the subject vehicle position can be recognized with high accuracy. When the subject vehicle position can be measured by sensors installed externally on the road or by the roadside, the subject vehicle position can be recognized by communicating with such sensors through the communication unit 7.

The external environment recognition unit 14 recognizes external circumstances around the subject vehicle based on signals from cameras, LIDERs, RADARs and the like of the external sensor group 1. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road division lines (white lines, etc.) and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 15 generates a driving path (target path) of the subject vehicle from present time point to a certain time ahead based on, for example, a target route computed by the navigation unit 6, map information stored in the memory unit 12, subject vehicle position recognized by the subject vehicle position recognition unit 13, and external circumstances recognized by the external environment recognition unit 14. When multiple paths are available on the target route as target path candidates, the action plan generation unit 15 selects from among them the path that optimally satisfies legal compliance, safe efficient driving and other criteria, and defines the selected path as the target path. The action plan generation unit 15 then generates an action plan matched to the generated target path. An action plan is also called "travel plan". The action plan generation unit 15 generates various kinds of action plans corresponding to overtake traveling for overtaking the forward vehicle, lane-change traveling to move from one traffic lane to another, following traveling to follow the preceding vehicle, lane-keep traveling to maintain same lane, deceleration or acceleration traveling. When generating a target path, the action plan generation unit 15 first decides a drive mode and generates the target path in line with the drive mode.

In self-drive mode, the driving control unit 16 controls the actuators AC to drive the subject vehicle along target path generated by the action plan generation unit 15. More specifically, the driving control unit 16 calculates required driving force for achieving the target accelerations of sequential unit times calculated by the action plan generation unit 15, taking running resistance caused by road gradient and the like into account. And the driving control unit 16 feedback-controls the actuators AC to bring actual acceleration detected by the internal sensor group 2, for example, into coincidence with target acceleration. In other words, the driving control unit 16 controls the actuators AC so that the subject vehicle travels at target speed and target acceleration. On the other hand, in manual drive mode, the driving control unit 16 controls the actuators AC in accordance with driving instructions by the driver (steering operation and the like) acquired from the internal sensor group 2.

Figure 2A:
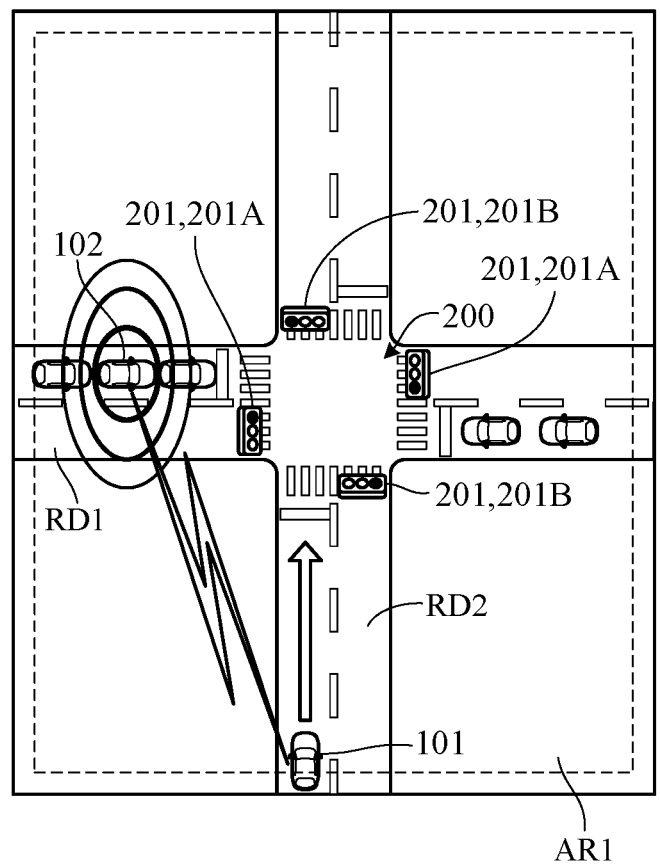
FIG. 2A is a view illustrating an example of a travel scene to which the information transmission system according to the embodiment of the present invention is applied.
Figure 2B:
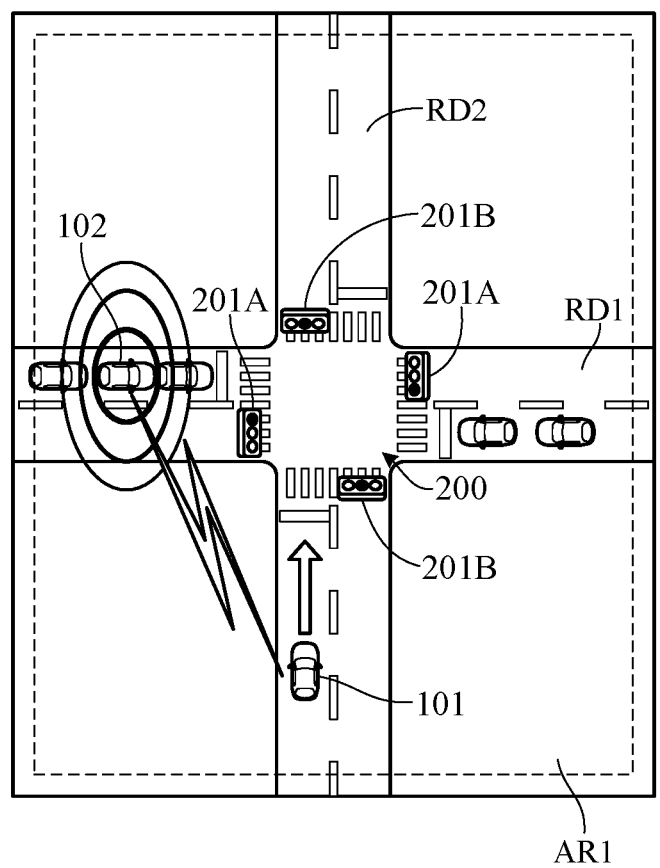
FIG. 2B is a view illustrating an example of the travel scene following FIG. 2A.
Figure 2C:
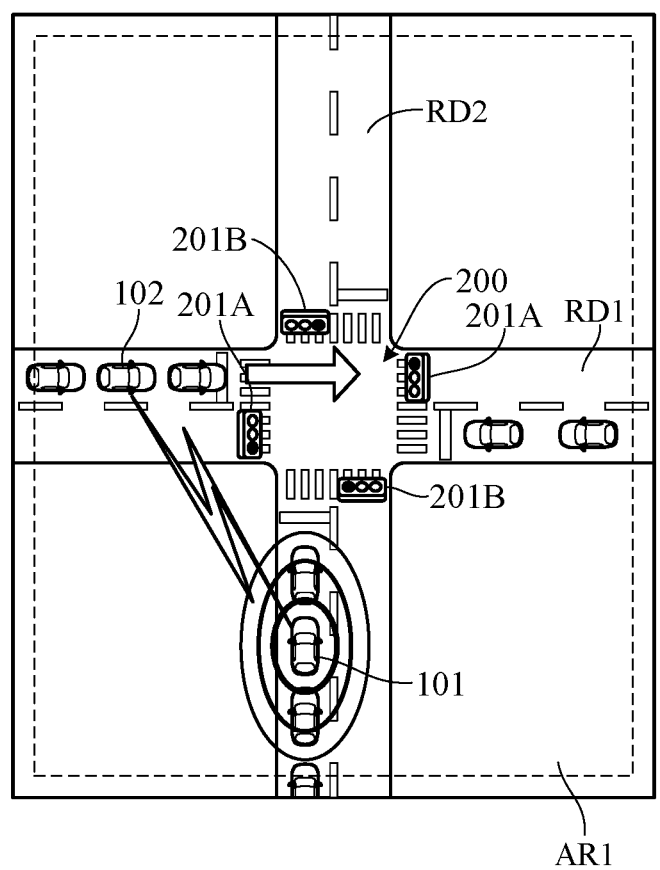
FIG. 2C is a view illustrating an example of the travel scene following FIG. 2B.

FIGS. 2A to 2C are diagrams illustrating an example of a travel scene to which the information transmission system according to the present embodiment is applied. FIGS. 2A to 2C illustrate an intersection 200 where a first road RD1 and a second road RD2 are orthogonal to each other. At the intersection 200, a first traffic light 201A for arranging traffic of vehicles traveling on the first road RD1 is installed facing the first road RD1, and a second traffic light 201B for arranging traffic of vehicles traveling on the second road RD2 is installed facing the second road RD2. The first traffic light 201A and the second traffic light 201B may be collectively referred to simply as traffic lights 201.

The first traffic light 201A and the second traffic light 201B are configured to sequentially switch between red light indicating a stop instruction, blue light indicating that traveling is possible, and yellow light indicating that traveling is possible but safe stop is difficult at a predetermined cycle. That is, when the first traffic light 201A is blue and yellow, the second traffic light 201B is red, and when the first traffic light 201A changes to red, the second traffic light 201B changes to blue. FIG. 2A illustrates a first time point, FIG. 2B illustrates a second time point after a lapse of a predetermined time from the first time point, and FIG. 2C illustrates a third time point after a lapse of a predetermined time from the second time point. In FIG. 2A, the first traffic light 201A is red and the second traffic light 201B is blue. In FIG. 2B, the first traffic light 201A is red and the second traffic light 201B is yellow. In FIG. 2C, the first traffic light 201A is blue and the second traffic light 201B is red.

The following description is based on the assumption, for convenience, that, among the plurality of vehicles illustrated in FIGS. 2A to 2C, a subject vehicle 101 and the other vehicle 102 perform inter-vehicle communication. The other vehicle 102 is a self-driving vehicle having the same vehicle control system (FIG. 1) as the subject vehicle 101, and for simplification of the description, vehicles other than the subject vehicle 101 and the other vehicle 102 do not have a function of performing inter-vehicle communication, or have a function of performing inter-vehicle communication but do not perform inter-vehicle communication.

FIG. 2A illustrates a state in which the subject vehicle 101 within a predetermined distance from the intersection 200 (traffic light 201) and the other vehicle 102 stopped within a predetermined distance from the intersection 200 have started inter-vehicle communication at the first time point when the first traffic light 201A is red. As illustrated in FIG. 2C, the inter-vehicle communication ends when the first traffic light 201A changes to blue at the third time point and the other vehicle 102 passes through the intersection 200. That is, the other vehicle 102 stopped at the first time point is an information transmission vehicle that transmits change information of the traffic light 201, and when the other vehicle 102 leaves the traffic light 201 at the third time point, the role of the other vehicle 102 as the information transmission vehicle ends.

At the third time point, the second traffic light 201B changes to red. Therefore, the subject vehicle 101 is stopped, and at this time point, the subject vehicle 101 takes over the role of the information transmission vehicle from the other vehicle 102. In other words, the subject vehicle 101 instead of the other vehicle 102 becomes the information transmission vehicle. Thereafter, the subject vehicle 101 performs inter-vehicle communication with another vehicle traveling on the first road RD1. When the second traffic light 201B changes to blue and the subject vehicle 101 passes through the intersection 200 at a fourth time point after the third time point, the role of the subject vehicle 101 as the information transmission vehicle ends. At this time, another vehicle stopped on the first road RD1 serves as an information transmission vehicle. In other words, the other vehicle instead of the subject vehicle 101 becomes the information transmission vehicle.

Figure 3:
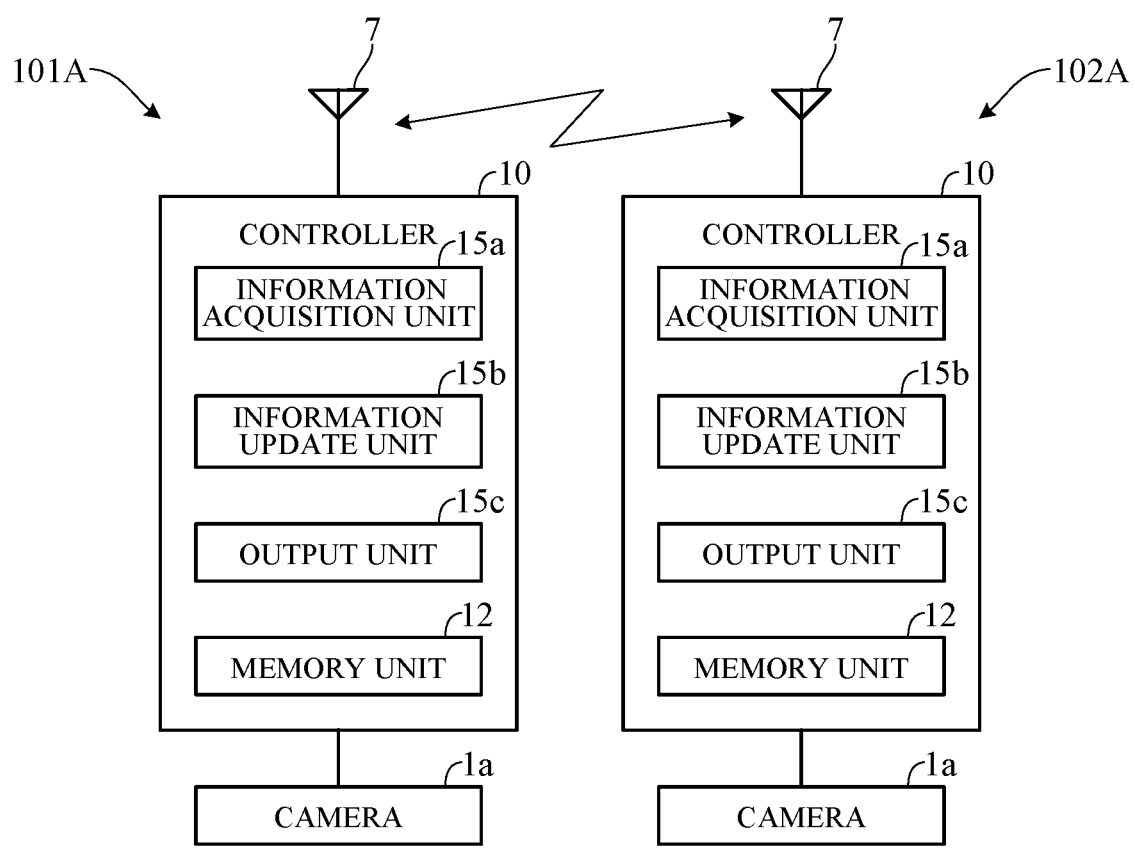
FIG. 3 is a block diagram illustrating a configuration of a substantial part of the information transmission system according to the embodiment of the present invention.

FIG. 3 is a block diagram illustrating main components of the information transmission system according to the present embodiment, that is, a block diagram illustrating main components of in-vehicle devices 101A and 102A provided in the subject vehicle 101 and the other vehicle 102, respectively. The components of the in-vehicle devices 101A and 102A are the same as each other. The in-vehicle devices 101A and 102A constitute a part of the vehicle control system 100 (FIG. 1).

As illustrated in FIG. 3, each of the in-vehicle devices 101A and 102A includes a controller 10, a communication unit 7, and a camera 1a. The camera 1a is a monocular camera having an imaging element (image sensor) such as a CCD or a CMOS, and constitutes a part of the external sensor group 1 illustrated in FIG. 1. The camera 1a may be a stereo camera. The camera 1a is mounted at a predetermined position, for example, in front of the subject vehicle 101, and continuously captures an image of a space in front of the subject vehicle 101 to acquire an image (camera image) of the object. The object includes the traffic lights 201.

The controller 10 includes an information acquisition unit 15a, an information update unit 15b, and an output unit 15c as functional components carried by the processing unit 11 (FIG. 1). The information acquisition unit 15a, the information update unit 15b, and the output unit 15c are used to generate an action plan (travel plan) of the vehicle 101 or 102, and are configured by, for example, the action plan generation unit 15 illustrated in FIG. 1. The information acquisition unit 15a, the information update unit 15b, and the output unit 15c also have a function of recognizing the external environment, and they may be configured by the external environment recognition unit 14 illustrated in FIG. 1.

When the other vehicle 102 stops in front of the first traffic light 201A and becomes an information transmission vehicle, the information acquisition unit 15a of the other vehicle 102 acquires information on change in the traffic light 201 (referred to as first information In1) from a vehicle (not illustrated) that was the information transmission vehicle immediately before the other vehicle 102, through inter-vehicle communication via the communication unit 7. The first information In1 includes information on a time (cycle) required for changing of the traffic light 201. More specifically, the first information In1 includes information on the times required for last several changes. The cycle information includes a time from when the traffic light 201 changes to blue until the traffic light 201 changes to yellow, a time from when the traffic light 201 changes to yellow until the traffic light 201 changes to red, and a time from when the traffic light 201 changes to red until the traffic light 201 changes to blue.

The controller 10 of the other vehicle 102 measures, based on the image acquired by the camera 1a, an elapsed time from when the first traffic light 201A changes to red until the present time point, in other words, an elapsed time since when the second traffic light 201B changes to blue. The information acquisition unit 15a of the other vehicle 102 also acquires information of the elapsed time (referred to as second information In2). The second information In2 on the elapsed time is also a type of change information.

Further, as illustrated in FIG. 2B, when it is recognized that the second traffic light 201B has changed from blue to yellow from the image acquired by the camera 1a of the subject vehicle 101, the information acquisition unit 15a of the other vehicle 102 acquires the information (referred to as third information In3) from the subject vehicle 101 (in-vehicle device 101A) via the communication unit 7. The controller 10 of the other vehicle 102 temporarily stores the acquired first information In1, second information In2, and third information In3 in the memory unit 12.

As illustrated in FIG. 2A, when the subject vehicle 101 approaches the intersection 200, more specifically, when the distance from the intersection 200 where the traffic light 201 is installed to the subject vehicle 101 becomes within a predetermined distance (within a predetermined range AR1 of a dotted line in FIG. 2A), the information acquisition unit 15a of the subject vehicle 101 acquires the first information In1 and the second information In2 on the changes in the traffic light via the communication unit 7 from the other vehicle 102 (in-vehicle device 102A) already located near the traffic light 201.

This allows the controller 10 of the subject vehicle 101 during traveling to grasp the remaining time until the second traffic light 201B changes to yellow. As a result, a good action plan of the subject vehicle 101 can be generated based on the prediction about the changing time of the second traffic light 201B. When taking over the role of the information transmission vehicle from the other vehicle 102, the information acquisition unit 15a of the subject vehicle 101 also acquires the change information (the first information In1, second information In2, and third information In3) updated by the other vehicle 102 via the communication unit 7.

The information update unit 15b of the other vehicle 102 that is stopped updates the change information of the traffic light 201 acquired by the information acquisition unit 15a of the other vehicle 102. That is, the information update unit 15b updates the second information In2 with the lapse of time. When the third information In3 is transmitted from the subject vehicle 101 via the communication unit 7, the information update unit 15b updates the change information by adding the third information In3 to the information possessed by the controller 10 of the in-vehicle device 102A. On the other hand, the information update unit 15b of the subject vehicle 101 updates the already acquired change information every time the information acquisition unit 15a of the subject vehicle 101 acquires the change information updated by the other vehicle 102.

As illustrated in FIG. 2C, when the first traffic light 201A changes to blue and the other vehicle 102 passes through the intersection 200, the output unit 15c of the other vehicle 102 outputs the change information of the traffic light 201 stored in the memory unit 12, that is, the first information In1, the second information In2, and the third information In3. The output information is transmitted to the subject vehicle 101 (in-vehicle device 101A) which is the next information transmission vehicle via the communication unit 7.

Figure 4:
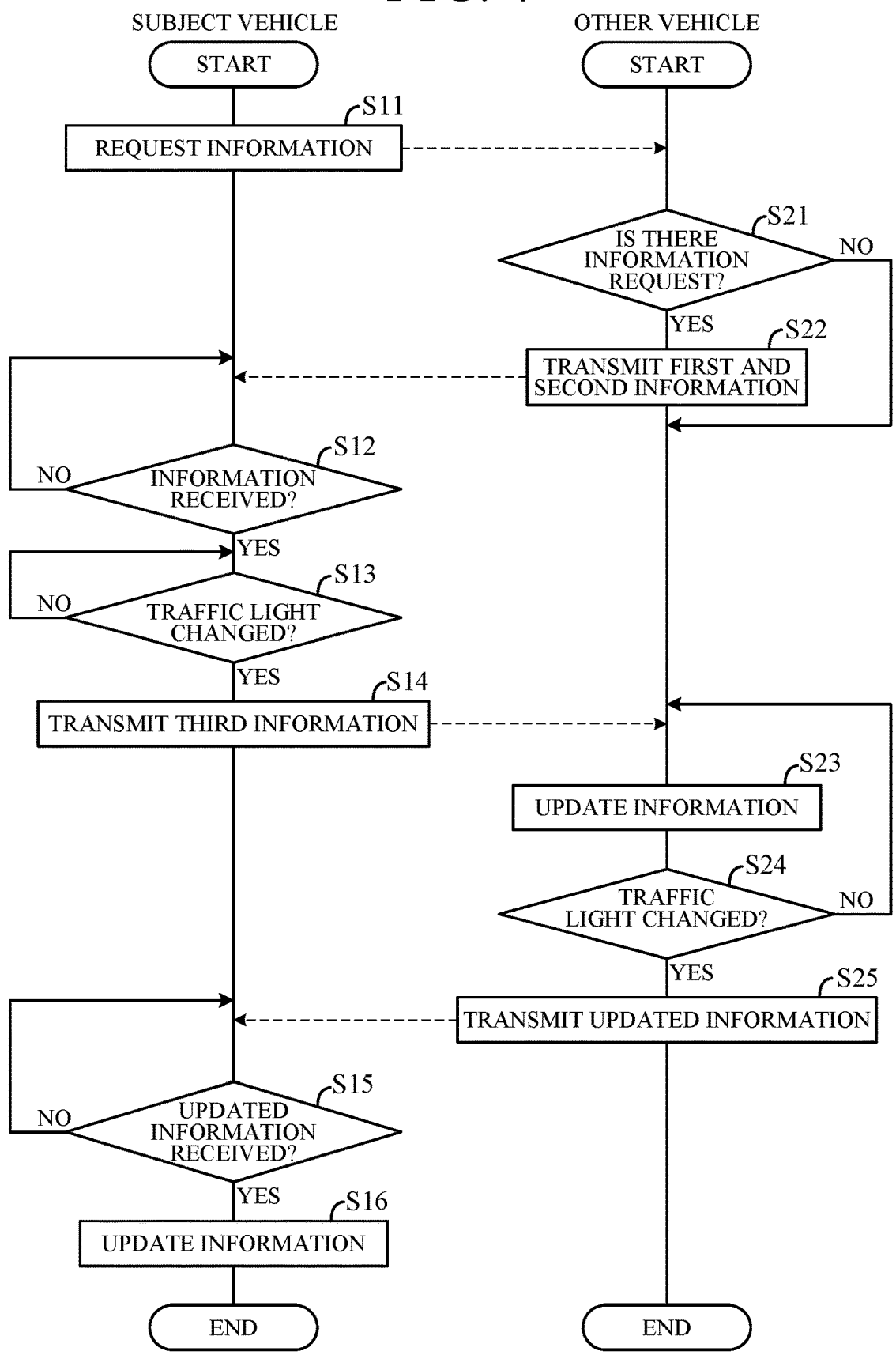
FIG. 4 is a flowchart illustrating an example of processing executed by a controller in FIG. 3.

FIG. 4 is a flowchart illustrating an example of processing by the information transmission system illustrated in FIG. 3, that is, an example of processing by the controllers 10 of the in-vehicle devices 101A and 102A. The processing illustrated in this flowchart is started when the distance of the subject vehicle 101 from the intersection 200 becomes within a predetermined distance in a state where the other vehicle 102 is stopped at the intersection 200 as illustrated in FIG. 2A, for example. That is, the processing is started when the position of the subject vehicle 101 detected by the position measurement sensor (position measurement unit 4) becomes within a predetermined range AR1 from the intersection 200. Alternatively, the processing may be started when the second traffic light 201B is recognized by the camera 1a of the subject vehicle 101. This processing is repeated at a predetermined cycle until the vehicles 101 and 102 pass through the intersection 200. Hereinafter, the processing will be described with reference to FIGS. 2A to 2C.

First, in S11 (S: processing step), the controller 10 of the subject vehicle 101 (in-vehicle device 101A) transmits a command for requesting change information of the second traffic light 201B via the communication unit 7. On the other hand, in S21, the controller 10 of the other vehicle 102 (in-vehicle device 101B) determines whether the request for change information is received from the subject vehicle 101. If the determination is in the affirmative in S21, the process goes to S22, and otherwise, the process passes S22 and goes to S23. In S22, the first information In1 stored in the memory unit 12, that is, the information on the change cycle of the traffic light 201, and the second information In2, that is, the information on the elapsed time from the change in the traffic light 201 are transmitted to the subject vehicle 101 via the communication unit 7.

In S12, the controller 10 of the subject vehicle 101 determines whether the first information In1 and the second information In2 have been received from the other vehicle 102. If the determination is in the negative in S12, the processing proceeds to S13.

Although not illustrated, if the determination is in the affirmative in S12, the controller 10 (action plan generation unit 15) of the subject vehicle 101 calculates the remaining time until the second traffic light 201B changes on the basis of the acquired information, and generates an action plan according to the time. For example, the controller 10 generates an action plan for acceleration or deceleration. In S13, the controller 10 determines whether the second traffic light 201B has changed from blue to yellow based on the camera image. As illustrated in FIG. 2B, when the second traffic light 201B has changed to yellow, the determination is in the affirmative in S13, the processing proceeds to S14, and the controller 10 transmits the change information, that is, the third information In3 via the communication unit 7.

In S23, the controller 10 of the other vehicle 102 measures the elapsed time from when the first traffic light 201A has changed to red based on the camera image, and updates the second information In2. Further, as illustrated in FIG. 2B, when the third information In3 transmitted from the subject vehicle 101 is received, the change information is updated by adding the third information In3. Then, in S24, the controller 10 determines whether the first traffic light 201A has changed to blue based on the camera image. If the determination is in the affirmative in S24, the process goes to S25, and otherwise, the process returns to S23.

In S25, as illustrated in FIG. 2C, the controller 10 transmits the updated change information (the first information In1, second information In2, and third information In3) on the traffic light 201 via communication unit 7. This information includes a command to change the information transmission vehicle from the other vehicle 102 to the subject vehicle 101. The position of the other vehicle 102 may be detected by a position measurement sensor or the like, and the updated change information may be transmitted to the subject vehicle 101 when the other vehicle 102 passes through the intersection 200. At this time, the change information stored in the memory unit 12 of the controller 10 of the other vehicle 102 is deleted, whereby the processing on the other vehicle 102 side is terminated.

On the other hand, in S15, the controller 10 of the subject vehicle 101 determines whether the updated change information has been received from the other vehicle 102 via the communication unit 7. When the determination is in the affirmative in S15, the processing proceeds to S16, and the change information of the traffic light 201 possessed by the controller 10 of the subject vehicle 101 is updated by the received change information and stored in the memory unit 12. At this point, the subject vehicle 101 becomes the information transmission vehicle, and thereafter, performs the processing similar to the above-described processing by the other vehicle 102.

Although FIG. 2A illustrates one other vehicle 102 capable of inter-vehicle communication, if there exists a plurality of vehicles capable of inter-vehicle communication and stopped at a red light, a vehicle located closest to the intersection 200 becomes an information transmission vehicle. Similarly, FIG. 2C illustrates one subject vehicle 101 capable of inter-vehicle communication, if there exists a plurality of vehicles capable of inter-vehicle communication and stopped at a red light, the vehicle located closest to the intersection 200 becomes the next information transmission vehicle. The vehicle located closest to the intersection 200 can be determined, for example, by measuring the positions of the vehicles by a position measurement sensor and comparing the positions of the vehicles. The information acquisition unit 15a specifies the vehicle (target vehicle) located closest to the intersection 200 based on the position information of the vehicles obtained by the position measurement sensor, and acquires change information from the specified vehicle.

The operation of the information transmission system according to the present embodiment is summarized as follows. As illustrated in FIG. 2A, when the subject vehicle 101 traveling on the second road RD2 enters the predetermined range AR1 from the intersection 200 having the traffic light 201, change information of the second traffic light 201B is transmitted from the other vehicle 102 in response to a request from the subject vehicle 101 via inter-vehicle communication (S22). That is, the other vehicle 102 is an information transmission vehicle that has reached the vicinity of the intersection 200 earlier than the subject vehicle 101, has already acquired the information of the traffic light 201, and further monitors the change state of the traffic light 201. Therefore, the subject vehicle 101 receives the change information of the traffic light 201 possessed by the other vehicle 102 as the information transmission vehicle. As a result, the subject vehicle 101 (controller 10) can grasp the time from the current time point until the second traffic light 201B changes to yellow, and can control the traveling operation of the subject vehicle 101 according to an appropriate action plan corresponding to the time.

As illustrated in FIGS. 2B and 2C, when the second traffic light 201B sequentially change to yellow and red and the subject vehicle 101 stops at the intersection 200, the subject vehicle 101 receives all the change information of the traffic light 201 possessed by the other vehicle 102 and takes over the role of the information transmission vehicle (S16). Thereafter, the stopped subject vehicle 101 transmits and receives information to and from the other vehicle 102 traveling on the first road RD1 through inter-vehicle communication. When the second traffic light 201B changes to blue again, the change information of the traffic light 201 possessed by the subject vehicle 101 is transmitted to the next information transmission vehicle (the vehicle stopped on the first road RD1). As described above, each time the information transmission vehicles are sequentially changed, the information of the traffic light 201 is delivered between the vehicles through inter-vehicle communication, whereby the change information of the traffic light 201 can be easily transmitted between the vehicles without installing roadside beacons or the like.

The present embodiment can achieve advantageous effects as follows:

(1) The information transmission system according to the present embodiment includes a first vehicle (for example, the other vehicle 102) that is subjected to traffic control by the traffic light 201, and a second vehicle (for example, the subject vehicle 101) that enters the intersection 200 after the first vehicle and is subjected to traffic control by the traffic light 201. The subject vehicle 101 and the other vehicle 102 each include the communication units 7 capable of communicating with each other, the information acquisition units 15a that acquire change information of the traffic light 201, and the information update units 15b that update the change information acquired by the information acquisition units 15a (FIG. 3). The information acquisition unit 15a of the subject vehicle 101 is configured to acquire (receive), via the communication unit 7, the change information updated by the information update unit 15b of the other vehicle 102 (FIG. 4). This makes it possible to acquire the change information of the traffic light 201 by a simple configuration without roadside beacons, and to suppress an increase in cost for acquiring the change information of the traffic light 201. Further, in the present embodiment, the traffic light to which the information transmission system is applied is not limited, and change information of various traffic lights can be easily acquired.

(2) The subject vehicle 101 and the other vehicle 102 each include the detection units that detect the state of the traffic light 201, that is, the cameras 1a (FIG. 3). When information on the state of the traffic light 201 (second traffic light 201B) detected by the camera 1a of the subject vehicle 101, that is, the information (third information In3) indicating that the second traffic light 201B has changed to yellow, is acquired by the information acquisition unit 15a of the other vehicle 102, the information update unit 15b of the other vehicle 102 updates the change information, (FIG. 4). This allows the controller 10 of the other vehicle 102 to grasp the duration of the time the traffic light 201 is blue and transmit the useful information.

(3) The traffic light 201 is installed at the intersection 200 between the first road RD1 on which the other vehicle 102 travels and the second road RD2 on which the subject vehicle 101 travels, and includes the first traffic light 201A installed facing the first road RD1 and the second traffic light 201B installed facing the second road RD2 (FIG. 2A). When information on the state of the second traffic light 201B detected by the camera 1a of the subject vehicle 101 is acquired by the information acquisition unit 15a of the other vehicle 102, the information update unit 15b of the other vehicle 102 updates the change information of the second traffic light 201B (FIG. 4). This allows the controller 10 of the other vehicle 102 to acquire the change information of the second traffic light 201B that cannot be recognized by the camera 1a of the other vehicle 102. Therefore, for example, transmitting this change information makes it possible to, after the second traffic light 201B changes again to blue, provide the vehicle traveling on the second road RD2 with useful information including the latest information on the change time until the second traffic light 201B changes from blue to yellow.

(4) The change information updated by the information update unit 15b of the other vehicle 102 includes a time during which a predetermined change state of the traffic light 201 (for example, the first traffic light 201A) continues, that is, duration time of the predetermined change state of the traffic light 201. This makes it possible to generate a good action plan of the self-driving vehicle in consideration of the change time of the traffic light 201.

(5) The change information updated by the information update unit 15b of the other vehicle 102 includes an elapsed time from when the traffic light 201 (for example, the first traffic light 201A) has changed. This makes it possible to predict the remaining time until the traffic light 201 changes to the next state (for example, blue to yellow), and optimally control the traveling operation of the self-driving vehicle.

The above embodiment may be modified into various forms. Hereinafter, some modifications will be described. In the above embodiment, the state of the traffic light 201 is detected by the cameras 1a, but the state of the traffic light may be detected by other detection devices mounted in the vehicles 101 and 102. In the above embodiment, the traffic light 201 sequentially changes to red, blue, and yellow as an example, but the type of traffic lights is not limited to that described above, and the present invention can be similarly applied to traffic lights other than that described above. For example, the traffic light may be not only a lighting-type traffic light but also a blinking-type traffic or a traffic light having an arrow. The traffic light may be a traffic light installed at a place other than an intersection, for example, a traffic light for arranging one-side alternate passage or a push button traffic light installed on a crosswalk or the like. Therefore, the traffic light 201 may not include the first traffic light 201A and the second traffic light 201B. In addition, the first vehicle and the second vehicle may not pass through roads orthogonal to each other but may pass through opposite lanes.

In the above embodiment, the subject vehicle and the other vehicle each have the communication units 7, but a communication unit may be configured in any manner as long as the communication units 7 can communicate with each other (can communicate between vehicles). In the above embodiment, the information acquisition units 15a acquire the first information In1, the second information In2, and the third information In3. However, an information acquisition unit may be configured in any manner as long as the information acquisition unit of the second vehicle is configured to acquire the change information updated by the information update unit of the first vehicle via the communication unit. In the above embodiment, the information update unit 15b updates the first information In1, the second information In2, and the third information In3. However, an information update unit may be configured in any manner as long as the information update unit updates the change information of the traffic light. The change information updated by the information update unit preferably includes a time during which a predetermined change state of the traffic light continues (for example, a duration of time the traffic light is red light or a duration of time the traffic light is the green), or an elapsed time after the traffic light has changed (for example, an elapsed time after the traffic light has changed to red or an elapsed time after the traffic light has changed to green).

In the above embodiment, the information transmission system is configured by a self-driving vehicle, but the information transmission system may be configured by a manual driving vehicle. In this case, it is preferable to provide the driver with the change information of the traffic light by, for example, display via a display installed in the vehicle or sound via a speaker installed in the vehicle.

The above embodiment can be combined as desired with one or more of the above modifications. The modifications can also be combined with one another.

According to the present invention, it is possible to transmit information on a traffic light with a simple configuration in which an increase in cost is suppressed.

Above, while the present invention has been described with reference to the preferred embodiments thereof, it will be understood, by those skilled in the art, that various changes and modifications may be made thereto without departing from the scope of the appended claims.

What is claimed is:

1. An information transmission system including a first vehicle and a second vehicle, the first vehicle being subjected to a traffic control by a traffic light, the second vehicle being subjected to the traffic control by the traffic light after the first vehicle, each of the first vehicle and the second vehicle comprising:
   a communication unit capable of communicating with each other;
   a detection device that detects a state of the traffic light; and
   an electronic control unit including a microprocessor and a memory connected to the microprocessor, wherein
   each of the microprocessor of the first vehicle and the microprocessor of the second vehicle is configured to perform:
   acquiring change information of the traffic light; and
   updating the change information acquired,
   the microprocessor of the second vehicle is configured to perform the acquiring including acquiring the change information updated by the microprocessor of the first vehicle through the communication unit, the traffic light is installed at an intersection between a first road on which the first vehicle travels and a second road on which the second vehicle travels, the traffic light includes a first traffic light installed facing the first road and a second traffic light installed facing the second road, the microprocessor of the first vehicle is configured to perform the updating including updating the change information of the second traffic light when information on the state of the second traffic light detected by the detection device of the second vehicle is acquired by the microprocessor of the first vehicle, and the microprocessor of the second vehicle is configured to perform the acquiring including acquiring the change information from the first vehicle through the communication unit when a distance from the intersection to the second vehicle becomes less than or equal to a predetermined distance under a situation where the first vehicle stops at the intersection.

2. The information transmission system according to claim 1, including a plurality of the first vehicles stopping at the intersection, wherein
the microprocessor of the second vehicle is configured to perform
the acquiring including specifying a target vehicle located closest to the intersection among the plurality of the first vehicles, and acquiring the change information from the target vehicle.

3. The information transmission system according to claim 1, wherein
the first vehicle is an information transmission vehicle that transmits the change information under a state stopping at the intersection, and
the microprocessor of the second vehicle is configured to perform
the acquiring including acquiring the change information so that the second vehicle instead of the first vehicle becomes the information transmission vehicle when the first vehicle starts to travel and passes through the intersection after the second vehicle stops at the intersection in accordance with a change of the traffic light.

4. The information transmission system according to claim 1, wherein
the change information updated by the microprocessor of the first vehicle includes a duration of a predetermined change state of the traffic light.

5. The information transmission system according to claim 1, wherein
the change information updated by the microprocessor of the first vehicle includes an elapsed time from when the traffic light has changed.

6. An information transmission system including a first vehicle and a second vehicle, the first vehicle being subjected to a traffic control by a traffic light, the second vehicle being subjected to the traffic control by the traffic light after the first vehicle, each of the first vehicle and the second vehicle comprising:
a communication unit capable of communicating with each other;
a detection device that detects a state of the traffic light; and
an electronic control unit including a microprocessor and a memory connected to the microprocessor, wherein
each of the microprocessor of the first vehicle and the microprocessor of the second vehicle is configured to perform:
acquiring change information of the traffic light; and
updating the change information acquired,
the microprocessor of the second vehicle is configured to perform
the acquiring including acquiring the change information updated by the microprocessor of the first vehicle through the communication unit,
the traffic light is installed at an intersection between a first road on which the first vehicle travels and a second road on which the second vehicle travels,
the traffic light includes a first traffic light installed facing the first road and a second traffic light installed facing the second road,
the microprocessor of the first vehicle is configured to perform
the updating including updating the change information of the second traffic light when information on the state of the second traffic light detected by the detection device of the second vehicle is acquired by the microprocessor of the first vehicle,
the information transmission system includes a plurality of the first vehicles stopping at the intersection, and
the microprocessor of the second vehicle is configured to perform
the acquiring including specifying a target vehicle located closest to the intersection among the plurality of the first vehicles, and acquiring the change information from the target vehicle.

7. An information transmission system including a first vehicle and a second vehicle, the first vehicle being subjected to a traffic control by a traffic light, the second vehicle being subjected to the traffic control by the traffic light after the first vehicle, each of the first vehicle and the second vehicle comprising:
a communication unit capable of communicating with each other;
a detection device that detects a state of the traffic light; and
an electronic control unit including a microprocessor and a memory connected to the microprocessor, wherein
each of the microprocessor of the first vehicle and the microprocessor of the second vehicle is configured to perform:
acquiring change information of the traffic light; and
updating the change information acquired,
the microprocessor of the second vehicle is configured to perform
the acquiring including acquiring the change information updated by the microprocessor of the first vehicle through the communication unit,
the traffic light is installed at an intersection between a first road on which the first vehicle travels and a second road on which the second vehicle travels,
the traffic light includes a first traffic light installed facing the first road and a second traffic light installed facing the second road,
the microprocessor of the first vehicle is configured to perform
the updating including updating the change information of the second traffic light when information on the state of the second traffic light detected by the detection device of the second vehicle is acquired by the microprocessor of the first vehicle, the first vehicle is an information transmission vehicle that transmits the change information under a state stopping at the intersection, and the microprocessor of the second vehicle is configured to perform the acquiring including acquiring the change information so that the second vehicle instead of the first vehicle becomes the information transmission vehicle when the first vehicle starts to travel and passes through the intersection after the second vehicle stops at the intersection in accordance with a change of the traffic light.

* * * * *